July 28, 1970 W. C. FINK ETAL 3,521,983
PHOTOFLASH LAMP
Filed May 21, 1968
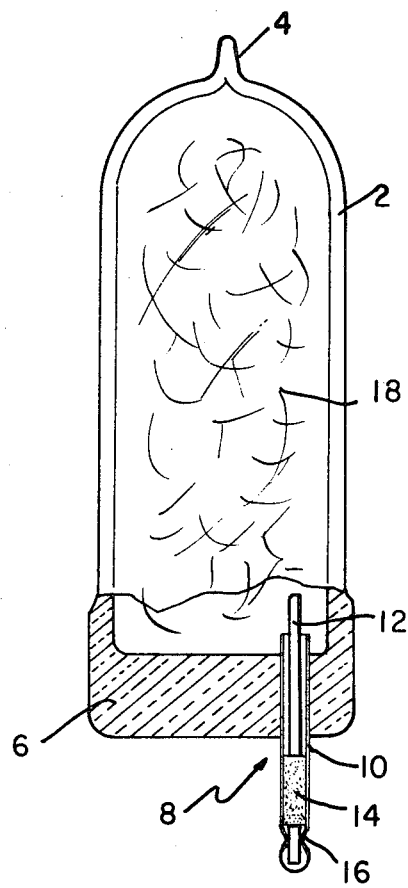
INVENTORS
JOHN W. SHAFFER
WILLIAM C. FINK
BY Joseph C. Ryan
ATTORNEY

United States Patent Office 3,521,983
Patented July 28, 1970

3,521,983
PHOTOFLASH LAMP
William C. Fink and John W. Shaffer, Williamsport, Pa., assignors to Sylvania Electric Products Inc., a corporation of Delaware
Filed May 21, 1968, Ser. No. 730,803
Int. Cl. F21k 5/02
U.S. Cl. 431—93          5 Claims

ABSTRACT OF THE DISCLOSURE

A percussive-type photoflash lamp in which a quantity of powdered boron instead of powdered zirconium is used in the fulminating material to improve sensitivity toward impact ignition and reliability while at the same time reducing the detrimental effect of shred compaction generally experienced with highly sensitive compositions.

---

This invention relates to the manufacture of photoflash lamps and more particularly those of the percussive-type.

Generally speaking, a percussive-type photoflash lamp comprises an hermetically sealed, light-transmitting envelope containing a source of actinic light and having a primer secured thereto. More particularly, the percussive-type photoflash lamp may comprise a length of glass tubing constricted to a tip at one end thereof and shaped to define a press at the other end thereof. The length of glass tubing which defines the lamp envelope contains a combustible such as shredded zirconium foil and a combustion-supporting gas such as oxygen. The primer may comprise a metal tube sealed intermediate its ends in the press and a charge of fulminating material on a wire supported in said tube.

Operation of the percussive-type photoflash lamp is initiated by an impact onto the tube to cause deflagration of the fulminating material up through the tube to ignite the combustible disposed in the lamp envelope. Often the high velocity flow of gas resulting from deflagration of the fulminating material impinges on the shredded combustible forming it into a compact mass located in the dome of the lamp. The combustion of such compacted shreds is very inefficient and the light output of the lamp does not attain its desired value.

The fulminating material in percussive-type flashlamps usually comprises a mixture of powdered zirconium, red phosphorus and potassium chlorate. By increasing the relativev quantity of zirconium in the formulation, the burning rate of the fulminating material may be reduced, and such a reduction in burning rate reduces the velocity of the gas flow impinging on the shreds and helps to minimize its detrimental effect. However, the impact ignition sensitivity of the fulminating material is found to vary inversely with the relative amount of zirconium present, and thus such slow burning zirconium-rich formulations give poor reliability of ignition by impact.

In view of the foregoing, one of the principal objects of this invention is to improve the fulminating material for a percussive-type photoflash lamp so that the adverse effects of a high burning rate may be minimized and at the same time not adversely affect the impact ignition sensitivity thereof.

In the copending application of John W. Shaffer, filed Apr. 22, 1968, entitled "Photoflash Lamp" and assigned to the assignee of this invention, it is pointed out that the substitution of powdered silicon for powdered zirconium in the fulminating material results in a composition that is at the same time both slower burning and more sensitive to ignition by impact. We have found that powdered boron may be used quite effectively in place of either zirconium or silicon. Surprisingly, such fulminating materials incorporating boron powder burn even less violently than similar silicon-based materials and are demonstrably more sensitive to impact ignition than are either zirconium or silicon counterparts. Another unexpected advantage of the use of boron is a greater retention of impact ignition sinsitivity than either silicon or zirconium, or of materials of similar composition, following accelerated aging tests at elevated temperatures.

In the accompanying drawing, the figure is an elevational view partly in section of a percussive-type photoflash lamp.

In the specific embodiment of the invention illustrated in the accompanying drawing, the percussive-type photoflash lamp illustrated therein comprises a length of glass tubing defining a hermetically sealed lamp envelope 2 constricted at one end to define an exhaust tip 4 and shaped to define a press 6 at the other end thereof. A primer 8 is sealed intermediate its ends in the press 6. The primer 8 comprises a metal tube 10, a wire 12 and a charge of fulminating material 14.

The end of the tube 10 located outside the lamp envelope 2 is closed whereas the other end, which is located inside the lamp envelope, is open. The wire 12 is supported within the tube 10 by a crimp 16 near the outside end thereof. The charge of fulminating material 14 is located on that segment of the wire 12 which is located in the exposed segment of the tube 10. A combustible such as filamentary zirconium 18 and a combustion-supporting gas such as oxygen are disposed within the lamp envelope 2.

By way of specific example, a satisfactory fulminating material for use in percussive-type photoflash lamps in accordance with the principles of this invention may contain the following composition on a dried basis: powdered boron, 32.36%; red phosphorus, 32.82%; potassium chlorate 32.82%; hydroxyethyl cellulose, 2.00%. Sufficient water may be added to give a suspension of the desired viscosity and handling characteristics for application of the fulminating material.

The ratio of phosphorus to potassium chlorate may be varied from about 0.3 to 3.0; however, a ratio of 1.0 is preferred. The weight percent of powdered boron in the composition may be varied from about 10% to 60%, depending on the specific burning characteristics desired. For example, by increasing the relative amount of boron in the formulation, the burning rate can be further reduced but at some sacrifice in sensitivity. On the other hand, a reduction in the relative amount of boron increases both the burning rate and sensitivity. Although this behavior is similar in principle to that of zirconium and silicon containing fulminating materials, it is significant to note that the use of boron permts a combined degree of both slow burning rate and high sensitivity that cannot be obtained simultaneously from zirconium-based or silicon-based compositions. The hydroxyethyl cellulose functions only passively as a binding agent and may constitute up to 5% by weight of the dried fulminating material.

What we claim is:
1. A photoflash lamp comprising:
   an hermetically sealed, light-transmitting envelope;
   a quantity of filamentary combustible material located within said envelope;
   a combustion-supporting gas in said envelope;
   and a primer secured to and extending from one end of said envelope, said primer including a charge of fulminating material having boron as one of its components.
2. The combination of claim 1 which the fulminating material comprises a mixture of powdered boron, red phosphorus and potassium chlorate.

3. The combination of claim 1 in which the weight percent of boron in the composition is between about 10% and 60%.

4. The combination of claim 2 in which the ratio of red phosphorus to potassium chlorate is between about 0.3 to 3.0.

5. The combination of claim 2 in which the ratio of red phosphorus to potassium chlorate is between about 0.3 to 3.0 and the weight percent of boron in the composition is between about 10% and 60%.

References Cited

FOREIGN PATENTS 516,947   9/1955   Canada.

EDWARD J. MICHAEL, Primary Examiner